Aug. 8, 1950 C. E. ERICKSON 2,517,992

TELEPHONE CONNECTING BLOCK

Filed Oct. 19, 1946

INVENTOR:
CLIFFORD E. ERICKSON
BY C. P. Soper
ATTORNEY

Patented Aug. 8, 1950

2,517,992

UNITED STATES PATENT OFFICE 2,517,992

TELEPHONE CONNECTING BLOCK

Clifford E. Erickson, Chicago, Ill., assignor to Kellogg Switchboard and Supply Company, Chicago, Ill., a corporation of Illinois Application October 19, 1946, Serial No. 704,398

1 Claim. (Cl. 173—324)

This invention relates to telephone connecting blocks such as are used at a desk-set subscriber station to serve as a junction point for the outside conductors and the conductors contained in the desk-set cord. Its general object is to provide an improved form of connecting block for the above purpose which is of sturdy construction, is economically produced, is easily installed, and permits the several conductors to be readily attached.

A specific object is to provide a block of the foregoing character which may be readily molded of a suitable insulating material, and which is so formed that suitable conducting terminal members may be readily assembled therewith and so that a suitable cover for concealing and protecting the terminal members may be readily attached.

A further object is to provide a simple and reliable arrangement for so securing the cord of the desk set to the block as to avoid strain on the individual conductors thereof incident to the use of the telephone set.

According to one feature of the invention, the improved connecting block is generally flat except for a raised transverse terminal-supporting ridge, which provides increased thickness to accommodate terminal screws.

According to a further feature, the block is provided with raised marginal rib sections formed integrally therewith to laterally locate the cover, and having spaces between them which cooperate with notches in the cover to provide entrance openings for the conductors.

Another feature resides in the arrangement for securing the desk-set cord to the block by providing a cord clamp which has arms engaged by the block and the cover to prevent withdrawal.

Other objects and features of the invention will appear as the description progresses.

The accompanying drawings, comprising Figs. 1 to 7, show views of a preferred form of a telephone connecting block embodying the features of the invention.

The connecting block is shown installed in connection with a local-battery telephone set whereat grounded ringing is employed. Such an installation requires four terminal members on the block. A common-battery telephone set requires the use of three terminals when grounded ringing is employed, requiring only two terminals when bridged ringing is employed. For purposes of standardization, the same four-terminal block may be used in each of the above instances. If desired, however, one or more terminals may be omitted when a large number of installations not requiring them are contemplated.

Figure 2:
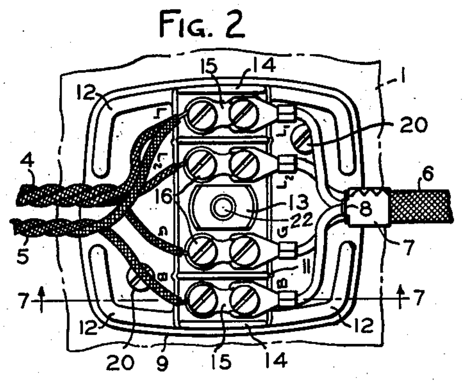
Fig. 2 is a top view with the cover removed.

Referring particularly to Fig. 2, the conductors incoming from the left provide the outside connections to the block, while the conductors in cord 6, at the right, extend to a telephone desk set (not shown). The outside conductors and the cord conductors are connected together through terminal members 15, to which they are secured. The upper two terminal members are for line conductors, and are designated $L_1$ and $L_2$, and the lower two are for ground and local-battery conductors, and are designated G and B.

Conductor group 4 comprises a pair of line conductors and a ground conductor, while conductor group 5 consists of a pair of local-battery conductors. Desk-set cord 6 has four conductors which comprise a pair of line conductors, a ground conductor, and a battery conductor.

As seen in Fig. 2, for example, the block proper is generally rectangular. It is composed of insulating material, and is preferably formed by molding. It has a raised transverse portion 10 supporting the four terminal members 15 high enough that the binding screws thereof may have ample length and still not extend through the block. The block 9 is of reduced height on the two sides of raised terminal-supporting portion 10 to permit the ready entrance of the conductors to the space between the cover and the block. Inter-terminal ribs 11 and 14 minimize the tendency for accidental cross connections between adjacent terminal members and between the outside terminal members and the cover. Raised central portion 13 is provided with hole 22 to receive screw 3 which holds cover 2 in place, while the bottom of the block has a suitable cavity, aligned with hole 22, to receive "speed nut" 17 (formed of sheet metal) which retains screw 3.

Block 9 is provided with raised marginal rib sections 12 to laterally locate cover 2 within which they are received when the cover is in place. Opposed gaps between the rib sections 12 cooperate with notches formed in cover 2 to permit the entrance of the outside-conductor groups 4 and 5 and cord 6.

Figure 5:
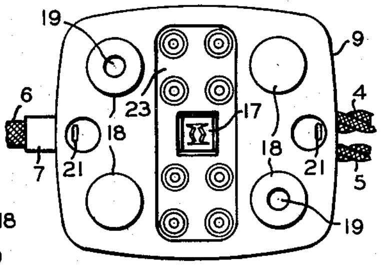
Fig. 5 shows the installed block as seen from the bottom with the sealing plate removed.

As best seen in Fig. 5, the bottom of block 9 is provided with four circular bosses 18, two of which have holes 19 to receive mounting screws 20 which secure the block to a suitable mounting surface, such as 1.

Figure 7:
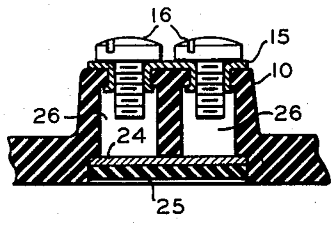
Fig. 7 is an enlarged sectional view taken along line 7—7 of Fig. 2 showing how the terminal members are secured in place.

Each terminal member 15 may be secured to the block as shown best in Fig. 7. For this purpose, openings 26 may be counterbored from below to receive twin tubular rivets formed integrally with the terminal member. After the terminal members are assembled to the block, the two hollow rivet portions are internally tapped to receive screws 16, under the heads of which the conductor ends may be secured. Cavity 23 (Fig. 5) receives sealing plate 24 and sealing compound 25 to seal the bottom of screw holes 26 against the entry of foreign particles and moisture.

Figure 1:
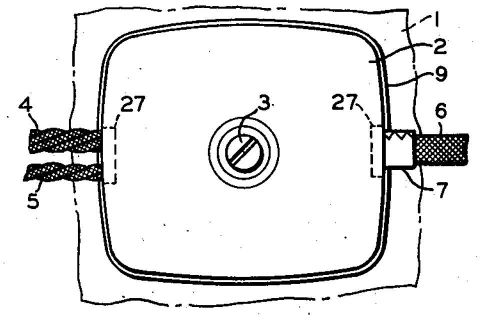
Fig. 1 is a top view of the installed block with cover in place.
Figure 3:
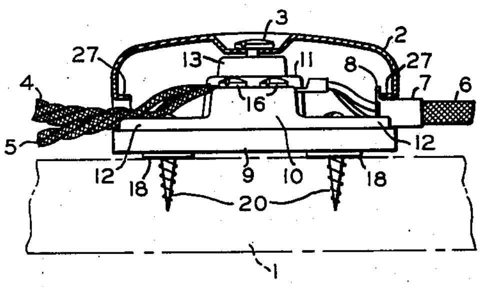
Fig. 3 is a front view with the cover shown in section.
Figure 4:
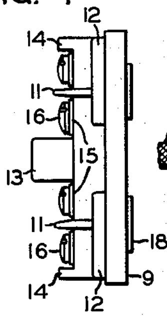
Fig. 4 is a side view of the block with the conductors and cover removed.

As best shown in Figs. 1 and 3, the cover is generally cup shaped. It is preferably of a drawn metal construction. It has opposed notches having turned-in edges 27 for admitting the outside-conductor groups 4 and 5 and cord 6. The top portion through which screw 3 passes is recessed downwardly leaving the head of screw 3 slightly below its surrounding surfaces.

Figure 6:
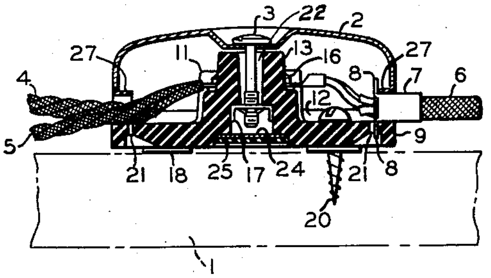
Fig. 6 is a front sectional view.

As shown best by comparing Figs. 2, 5, and 6, the desk-set cord 6 has a cord clamp 7 secured around it, having opposed arms 8. The lower arm 8 is inserted into a slot 21 (Fig. 6) in the block. The upper arm 8 engages the turned-in edge 27 of the cover 2. The clamp is of such a size that it is closely confined between the cover and block, whereby arms 8 hold it against rotation as well as against withdrawal, thereby preventing the clamped portion of the desk-set cord from being twisted or pulled out incident to the use of the telephone set.

I claim:

A connecting-block arrangement including a generally flat block of insulating material and a series of terminal members supported thereon, and a cup-like cover removably supported on the block to enclose the upper face thereof, the cover being supported on the upper surface of the block with the outer sidewalls of the cover in general alignment with the periphery thereof, such support being by engagement of the defining edge at the open end of the cover with the marginal portion of the upper surface of the block, the cover and block cooperating to define an entrance opening for conductors secured to the terminal members, a clamp for the conductors surrounding them and having opposed arms, said clamp extending through the entrance opening and being of such size that it is closely confined therein with said arms disposed within the space enclosed by the cover and block at a substantial distance inwardly of the inner sidewalls of the cover, and extending upwardly and downwardly, respectively, means coacting with said arms to prevent withdrawal of the clamp and to limit rotational movement thereof, a portion of the cover adjacent to the entrance opening extending inwardly to provide an abutment for the outward face of the upwardly extending arm to comprise one part of said means for preventing withdrawal, there being a recess extending downwardly into the block through the upper surface thereof, said recess receiving the downwardly extending arm of the clamp and being so located that one side wall thereof provides an abutment for the outward face of the downwardly extending arm directly underlying the first said abutment to comprise the remainder of said means for preventing withdrawal, other side walls of said recess coacting with the downwardly extending arm to comprise said means for limiting rotational movement of the clamp.

CLIFFORD E. ERICKSON.

REFERENCES CITED

The following references are of record in the file of this patent:

UNITED STATES PATENTS

| Number | Name | Date |
|---|---|---|
| 1,148,699 | McWilliams | Aug. 3, 1915 |
| 1,659,303 | Rovere | Feb. 14, 1928 |
| 1,915,199 | Park | June 20, 1933 |
| 2,199,219 | Edwards | Apr. 30, 1940 |
| 2,369,380 | Tinnerman | Feb. 13, 1945 |

FOREIGN PATENTS

| Number | Country | Date |
|---|---|---|
| 145,356 | Great Britain | July 2, 1920 |
| 540,780 | Germany | Dec. 29, 1931 |
| 564,156 | France | Oct. 15, 1923 |